M. KROKAVETZ.
STORAGE BATTERY PLATE.
APPLICATION FILED APR. 6, 1914.
1,107,618.
Patented Aug. 18, 1914.
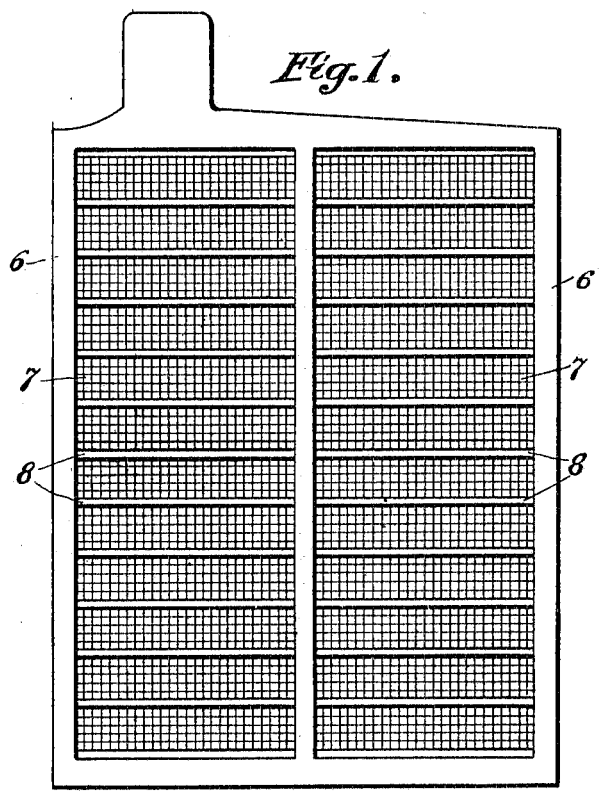
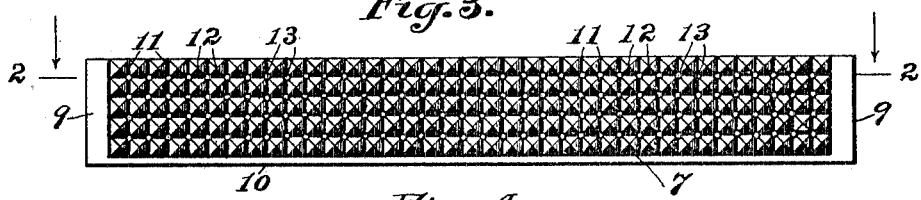
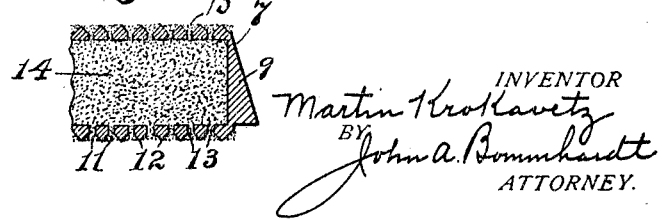
WITNESSES:
S.W. Brainard
Anna Hatters
INVENTOR
Martin Krokavetz
BY John A. Bommhardt
ATTORNEY.

UNITED STATES PATENT OFFICE.

MARTIN KROKAVETZ, OF CLEVELAND, OHIO.

STORAGE-BATTERY PLATE.

1,107,618.　　　　Specification of Letters Patent.　　Patented Aug. 18, 1914.

Application filed April 6, 1914. Serial No. 829 842.

*To all whom it may concern:*

Be it known that I, MARTIN KROKAVETZ, citizen of the United States, residing at Cleveland, in the county of Cuyahoga and State of Ohio, have invented certain new and useful Improvements in Storage-Battery Plates, of which the following is a specification.

This invention relates to storage battery plates and has for its object to provide an improved plate which will have the advantages of both the Planté and Faure types, being characterized particularly by a higher capacity due to the fact that the plate is provided with chemically deposited active material, "formed" as in the Planté cells, and also contains troughs or holders in which active material is artificially placed as in the Faure cells.

A further feature of the invention is an increased strength and space for expansion without buckling, and which requires no rubber, wood, paper or other material to hold the active matter in place, and therefore the plate will stand more rough handling than other plates.

A further feature of the invention is the production of pyramidal points or projections on the outside of the troughs or holders, with perforations between the projections, giving a large exposed surface, and also permitting access of the electrolyte to the material in the troughs.

The invention is illustrated in the accompanying drawings in which:—

Figure 1 is a side elevation of the plate. Fig. 2 is a section on the line 2—2 of Fig. 3. Fig. 3 is a side view of one of the troughs or holders. Fig. 4 is a cross section of one of the troughs.

Referring specifically to the drawings, the plate comprises a frame 6 which is made from antimony-lead alloy. This frame may have as many divisions as desired to receive the holder. Two are shown in Fig. 1. Each division or section of the frame is provided with a plurality of holders or troughs indicated as a whole at 7, and the particular construction of which is important. These holders are made of pure lead, and when the active material is applied combine the characteristics of both the Faure and Planté types. The troughs or holders are set in the frame, one above the other, with spaces 8 therebetween, the troughs being welded or otherwise secured in the frame, and the spaces permitting the troughs to expand without buckling or fracturing the frame or the plate. The ends of the trough are provided with solid projecting parts 9 so that they can be conveniently welded to the frame.

The bottom of the trough is plain or flat and imperforate as indicated at 10, but the sides thereof are provided with a multiplicity of pyramidal projections or points 12 formed by criss-cross V-shaped grooves 11 in the exterior of said sides, and at each intersection of the grooves a perforation 13 is made, through the side wall, thereby producing a multiplicity of perforations at the corners of said points. This gives the outside of the plates a very large surface for active material, and the perforations enable the electrolyte to have access to the inner active material or paste, as indicated at 14 in Fig. 4.

The outside of each trough is "formed" as in the Planté system, the active material being deposited chemically by electrical action, said material being indicated at 15 in Fig. 4, and this active material covers or is deposited between the projections or points and also fills up the small perforations 13 in the side or walls, thus acting as a screen or protector for the inner active material 14 of the Faure type. After the outside of the trough or holder is thus formed, the inside of the trough is filled with the paste or active material, and after this is done the troughs are assembled or placed in the frame as above described.

A plate so constructed will have the advantages referred to above, and the invention is not limited to the exact embodiment shown but is capable of variations within the scope thereof.

What I claim as new is:—

A battery plate having a plurality of trough shaped holders therein, active material within each holder, the exterior of the sides of the holder having numerous long grooves and pyramidal projections between the grooves, and perforations at the intersections of the grooves, and active material on the exterior of said sides.

In testimony whereof, I do affix my signature in presence of two witnesses.

MARTIN KROKAVETZ.

Witnesses:
JOHN A. BOMMHARDT,
EDWARD J. HOBDAY.

Copies of this patent may be obtained for five cents each, by addressing the "Commissioner of Patents. Washington, D. C."